Dec. 21, 1965   R. G. BRIDGES ET AL   3,225,126
EXPANDABLE BEAD MOLDING
Original Filed Oct. 10, 1960   8 Sheets-Sheet 6

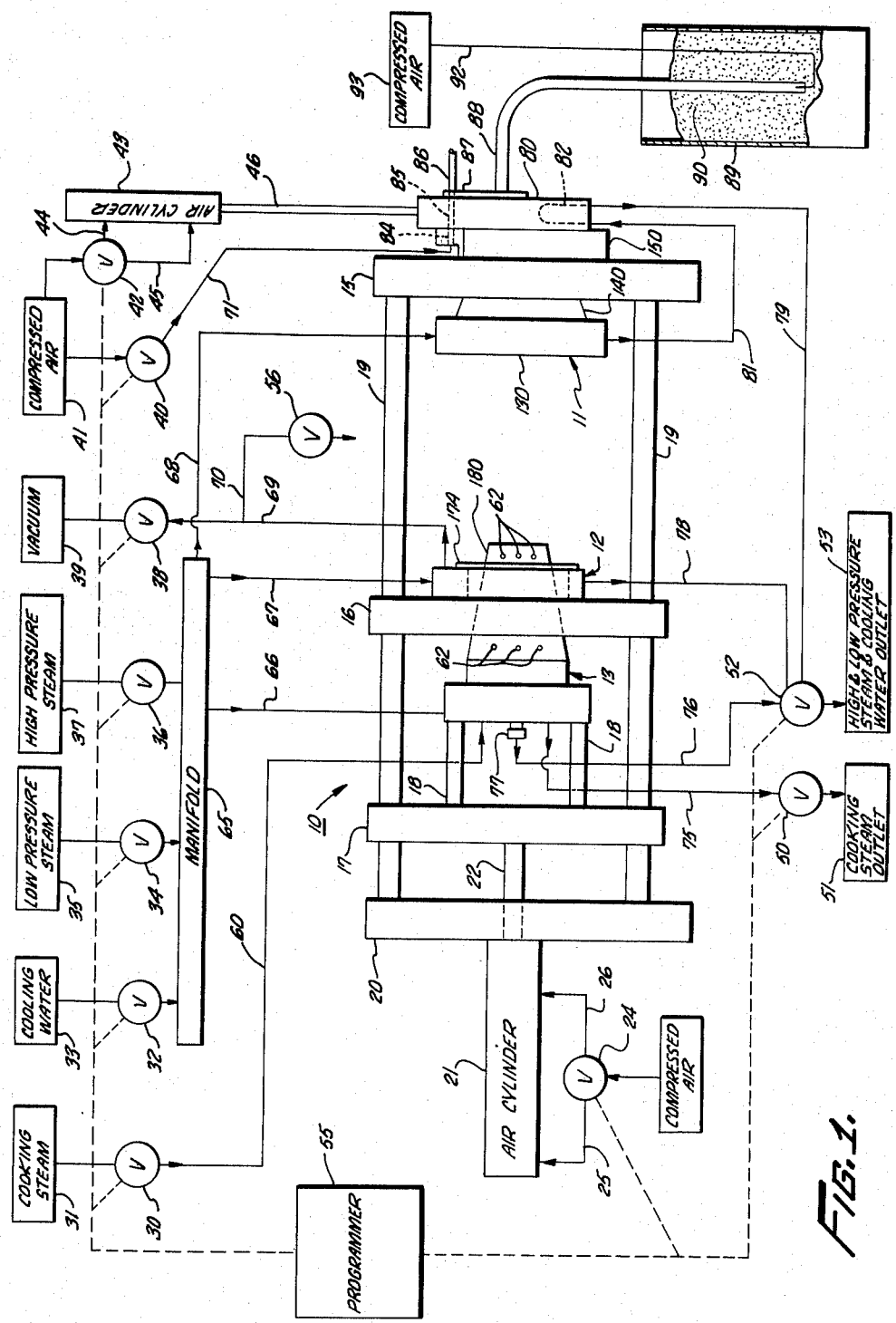

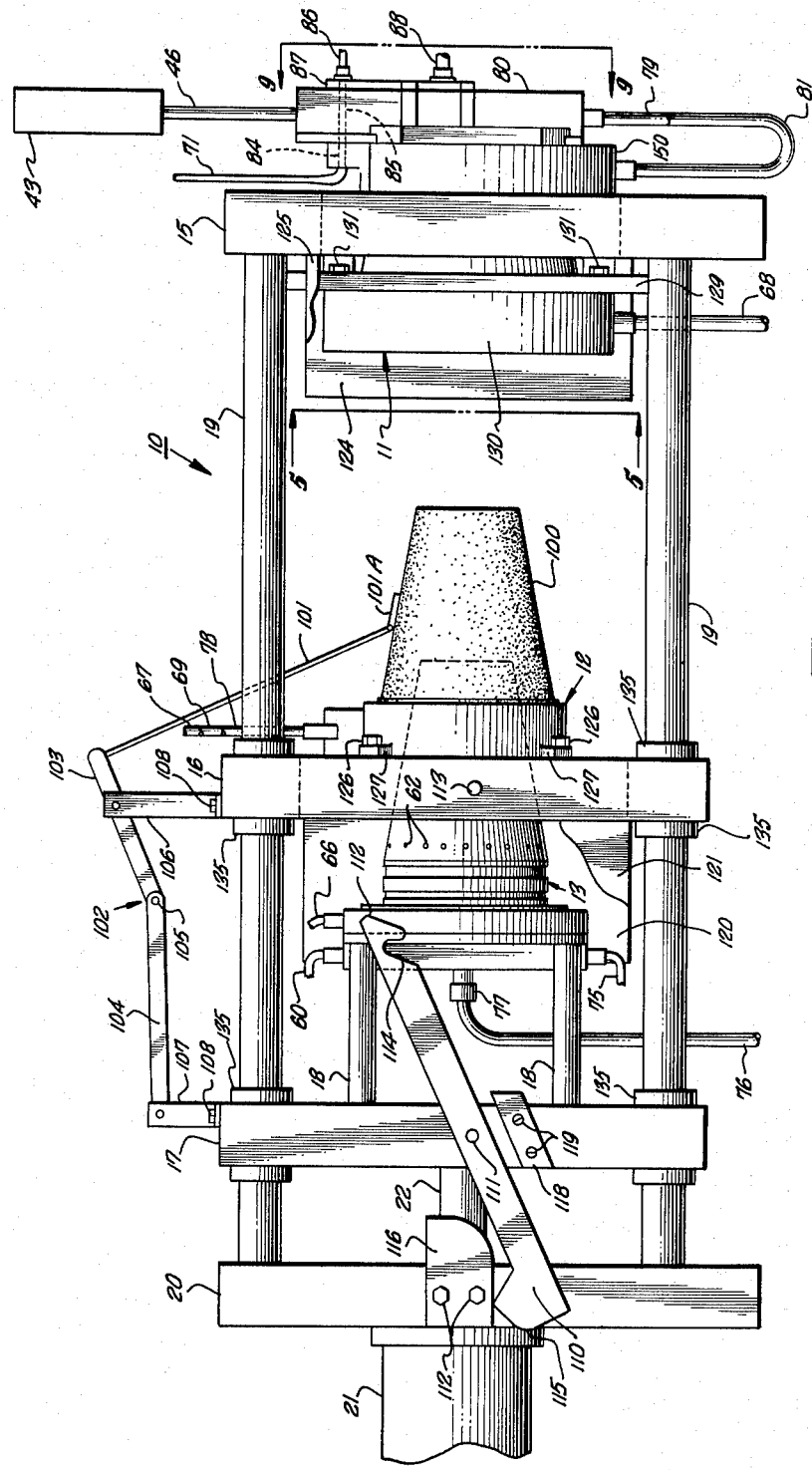

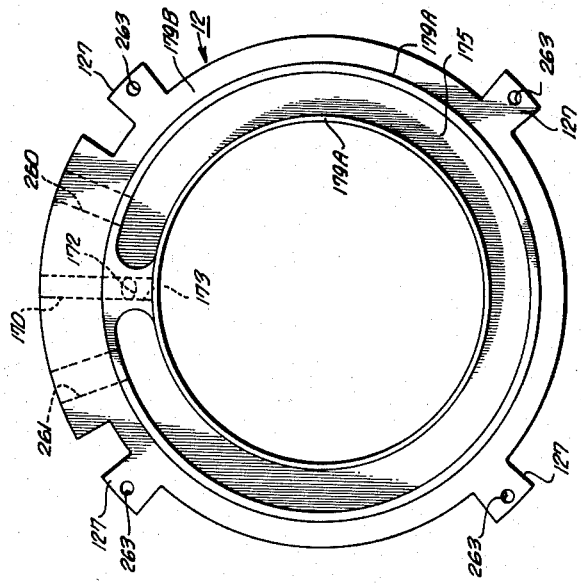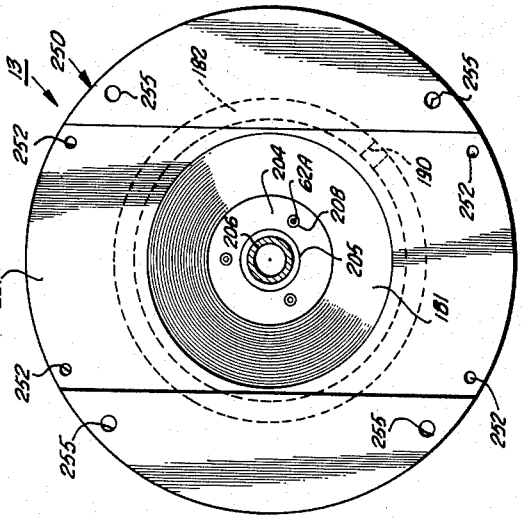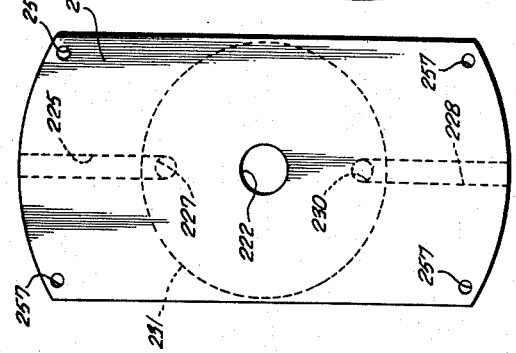

United States Patent Office

3,225,126
Patented Dec. 21, 1965

3,225,126
EXPANDABLE BEAD MOLDING
Roy G. Bridges, Rivera, Robert N. Aleson, San Fernando, Douglas B. Hutchings, North Hollywood, Ralph E. Whited, Altadena, and Miron L. Dyrness, North Hollywood, Calif., assignors to Tempo Plastic Company, Inc., Los Angeles, Calif., a corporation of California
Original application Oct. 10, 1960, Ser. No. 61,566. Divided and this application May 6, 1963, Ser. No. 286,099
8 Claims. (Cl. 264—51)

This application is a division of co-pending application Serial No. 61,566, filed October 10, 1960, for Expandable Bead Molding, and now abandoned.

This invention relates to a method for molding expandable plastic beads and the objects formed by such molding.

Articles made by the expansion of plastic beads have been commercially available for some time. One of the most widely distributed of such articles has been cups molded from polystyrene beads. A device for molding such cups is shown in U.S. Patent No. 2,951,260. Cups and other articles made by the expansion of plastic beads have heretofore commonly suffered from an excessive brittleness, often being crushed during handling or use. Furthermore, the automatic molding of a variety of objects has not been possible heretofore, such automatic or semi-automatic molding having been limited to thin-walled objects, such as cups.

The plastic beads most often utilized in this type of molding are polystyrene beads, which are commercially available from a number of manufacturers. In order to obtain a molded product of uniform low density, the beads are commonly subjected to a preliminary processing known as pre-expansion, in which the unconfined expansion of the beads is induced. A variety of methods and types of apparatus may be utilized to accomplish pre-expansion. For example, the unexpanded beads may be continuously fed into an upright drum. At the base thereof, steam is injected into the drum to heat the beads, thus causing expansion. The drum preferably contains revolving agitators to prevent bead fusion during pre-expansion. As the beads expand their bulk density decreases. The pre-expanded beads therefore rise to the top of the drum, and may be removed therefrom by a simple overflow outlet. Pre-expanded beads for use in cup molding are expanded to have a density preferably of from one to ten pounds per cubic foot, although densities as high as fifty pounds per cubic foot are practicable.

According to the present invention, an improved method is utilized to produce a molded object of improved characteristics, particularly, with respect to brittleness. The invention is especially appropriate for producing an improved polystyrene cup from pre-expanded polystyrene beads. The improved cup so produced has greater flexibility than cups heretofore available, while retaining or improving the other desirable characteristics of such cups. These improved characteristics are produced in the molding of other objects as well and it is to be understood that the invention is generally applicable to the automatic molding of thin or thick walled objects from expandable plastic beads and includes the objects so molded. The invention is described herein specifically with respect to the molding of the cups from polystyrene beads. The molding of cups and the use of polystyrene beads is not, however, to be considered as restricting the practice of the invention to such material or to the molding of such objects.

A molded plastic object according to the preferred embodiment of the present invention is formed from beads which have been pre-expanded, if desired, according to well-known methods. The pre-expanded beads are injected into the cavity of a heated mold. Concurrent with the expansion of the pre-expanded beads due to the mold temperature, in the preferred embodiment, steam is injected into the mold cavity so as to be in intimate contact with the beads. In the preferred embodiment, the cavity is also vented during molding. The expansion of the pre-expanded beads within the mold, resulting from the cooperative effects of the mold temperature, injection of steam into the mold cavity, and venting of the cavity, forms a plastic object having an improved characteristic of rigidity with respect to such objects as were known heretofore.

The improved method of making objects according to the present invention, in its preferred embodiment, contemplates injecting beads, which have been pre-expanded, if desired, into the cavity of a heated mold, expanding the beads within the mold cavity by the concurrent application of heat from the mold and injection of steam into the cavity, together with the venting of the cavity during molding, cooling the cavity, and subsequently removing the object from the cavity.

The apparatus for the practice of the invention consists, in general, of a mold assembly, having as a first component, a shell portion, and, as a second component, a core portion. Either of these components includes a sub-component portion, which is selectively movable relative to its major component to eject the molded object from the assembly. When molding cups or the like, it is preferred that the core portion include the core proper and the sub-component, designated as the stripper ring, which is detachable from the core. Alternate structures also suitable for molding cups of other objects in practicing the invention, which do not use a stripper ring as such, but do include a sub-component associated either with the shell portion or the core portion and selectively relatively movable with respect thereto are contemplated by the invention. In the apparatus, means are provided to inject steam, hereinafter referred to as cooking steam, into the mold cavity to contact the beads during molding. The cavity is preferably vented during at least a substantial portion of the molding. Means are included to provide steam at two temperatures, hereinafter referred to as high pressure steam and low pressure steam, and cooling water, to each of the three mold components. Exhaust means are provided to remove the high and low pressure steam, cooling water and cooking steam from the mold assembly. Means are provided to open and close the mold assembly. A programmer, connected to the aforementioned means, is utilized to initiate automatic cyclical molding. While the present form of the apparatus is described with respect to the use of high and low pressure steam, cooling water and cooking steam, it is to be understood that the invention is not limited to the utilization of these fluids solely. Any fluid of appropriate characteristics and temperature may be utilized in place of any of the preceding fluids. Furthermore, with the exception of the cooking steam, none of these fluids contacts the beads, and since their function is solely heating or cooling, other means of heating or cooling can be substituted therefor.

Means are provided to fill the closed mold cavity at a preselected time with beads contained in a bin. In the preferred embodiment, the beads have been pre-expanded, and are injected into the mold cavity by means of compressed air. The necessity for metering the amount of beads to be fed into the mold cavity is eliminated by the utilization of compressed air, in conjunction with bead feeding apparatus and mold apparatus and method of the present invention. By utilizing the present invention, bead feeding and molding are not restricted by the requirement that the quantity of beads to be injected into the mold be metered or measured. The requirements that gravity of feed for beads be used and that the mold be disposed so as to have that portion of the mold cavity into which the beads are fed in an elevated disposition with respect to the remainder of the cavity are eliminated.

The invention may be more readily understood by referring to the accompanying drawings in which:

FIGURE 1 is a block schematic of apparatus for the molding of cups from polystyrene beads according to the present invention;

FIGURE 2A is a side elevation of the mold apparatus of FIG. 1 in its opened position;

FIGURE 5 is an end view, partially in section, of the mold shell component;

FIGURE 7 is a side elevation of an end plate which closes the core component;

FIGURE 8 is an end view of the stripper ring component;

Figure 3B:
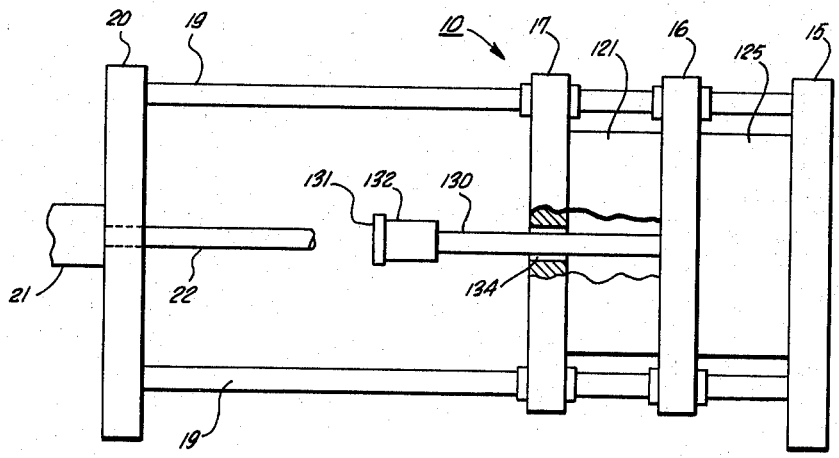
FIGURE 3B is a side elevation of a portion of the apparatus of FIG. 3A.

Referring now to FIG. 1, a mold assembly, indicated generally at 10, is shown in its opened position. The mold assembly 10 includes a shell portion 11, a stripper ring 12, and a core 13. The shell 11 and stripper ring 12 are attached to first and second mounting plates 15 and 16, respectively. The core 13 is connected to a third mounting plate 17 by means of four standoff lugs 18, only two of which are shown in FIG. 1. Four aligning bars 19, only two of which are shown in FIG. 1, extend between the first mounting plate 15 and a fourth mounting plate 20. The second and third mounting plates 16 and 17 are mounted on the aligning bars 19, so as to be movable therealong between the first mounting plate 15 and the fourth mounting plate 20. An air cylinder 21 is attached to the fourth mounting plate 20 and has a piston rod 22 extending therefrom and through the fourth mounting plate 20. The piston rod 22 is attached to the third mounting plate 17. The first air cylinder 21 has a first compressed air control valve 24 connected to two control lines 25 and 26, which extend into the cylinder 21 on either side of a piston (not shown) positioned therewithin. The piston rod 22 is connected to this piston. When actuated by the control valve 24, compressed air is selectively applied to one or the other of the control lines 25, 26 and enters the cylinder 21, causing the piston to move. The piston movement moves the piston rod 22 and thus the third mounting plate 17 toward or away from the first mounting plate 15, as is appropriate.

The first and fourth mounting plates 15 and 20 are shown in FIG. 1 as being of greater length than the second and third mounting plates 16 and 17. Such additional length is utilized to indicate that, in the preferred embodiment of the apparatus shown in FIG. 1, the first and fourth mounting plates 15 and 20 are secured to a frame assembly (not shown) for the apparatus, or to the structure in which the apparatus is housed, so as to be fixed in position. The second and third mounting plates 16, 17, as will be subsequently explained, move between the position shown in FIG. 1, and a position adjacent the first mounting plate 15. These two positions, the open and closed positions of the mold assembly 10, are more clearly shown in FIGS. 2 and 3. However, it is to be understood that the apparatus of the invention can be modified so that the second mounting plate 16 is fixed in position and the first and third mounting plates 15, 17 are movable, thus selectively moving the core 13 and the shell 11 away from the stripper ring 12 to open the mold assembly. Also, the apparatus can be modified so as to have the third mounting plate 17 fixed in position, and the first and second mounting plates 15, 16 then being movable with respect thereto so as to provide for the moving of the shell 11 and stripper ring 12 away from the core 13 to open the mold assembly 10.

A cooking steam inlet valve 30 is connected to a source of cooking steam 31; a cooling water inlet valve 32, to a source of cooling water 33, a low pressure steam inlet valve 34, to a source of low pressure steam 35; a high pressure steam inlet valve 36, to a source of high pressure steam 37; a vacuum control valve 38, to a source of vacuum 39; and a bead blow back valve 40, to a source of compressed air 41. The source of compressed air 41 is also applied to a second air cylinder control valve 42 which is associated with a second air cylinder 43. The compressed air from the second air cylinder control valve 42 is supplied to the second air cylinder 43 through either of two air cylinder inlet lines 44 or 45. The second air cylinder 43 has a piston (not shown) which is connected to a piston rod 46, shown as extending from the cylinder 43.

A cooking steam exhaust valve 50 is connected to a cooking steam outlet 51; and a high and low pressure steam and cooling water exhaust valve 52, to a high and low pressure steam and cooling water outlet 53. Each of the control valves 30, 32, 34, 36, 38, 40, 50 and 52 are of conventional construction and can be, for example, solenoid control valves. These valves are connected to a programmer 55. The programmer 55 controls the opening and closing of each of the valves in the apparatus, with the exception of a swing check valve 56, which is connected to the outlet of the vacuum control valve 38 and closes when the vacuum control valve 38 opens.

The cooking steam inlet valve 30 is connected to the core 13 through a cooking steam inlet line 60, which connects through an end plate (not shown, see FIG. 3A) to the interior of the core 13. Cooking steam 31 passing into the interior of the core 13, escapes therefrom through a plurality of apertures 62 of fluid conduits (not shown, see FIG. 4) which extend through the wall of the core 13. The cooling water, low pressure steam, and high pressure steam inlet valves 32, 34, 36, respectively, are connected to a manifold 65. The manifold 65 is connected to the core 13 by a first manifold outlet line 66, to the stripper ring 12 by a second manifold outlet line 67, and to the shell 11 by a third manifold outlet line 68. The vacuum control valve 38 is connected to the stripper ring 12 by a vacuum inlet line 69. The swing check valve 56 is connected to the vacuum inlet line 69 by a vacuum connecting line 70. Thus, the swing check valve 56 is open to vent the stripper ring when the vacuum control valve 38 is closed. The second compressed air control valve 40 is connected to the shell 11 by a compressed air connecting line 71 to provide for bead blow back, as will subsequently be explained.

A cooking steam exhaust line 75 is connected between the core 13 and the cooking steam exhaust valve 50. A first high and low pressure steam and cooling water exhaust line 76 is connected between an outlet connector 77 of the core assembly 13 and the high and low pressure steam and cooling water exhaust valve 52. The valve 52 also has connected thereto a second exhaust line 78, which is connected to the stripper ring 12, and a third exhaust line 79, which is connected to a slide plate assembly 80. A high and low pressure steam and cooling water transfer line 81 is connected between the shell 11 and the slide plate assembly 80, so as to apply the high and low pressure steam and cooling water which has passed through the shell 11 to the slide plate assembly 80. The lines 81 and 79 are connected to the slide plate assembly 80 so that the high and low pressure steam and cooling water from the transfer line 81 pass through the slide plate assembly 80 and into the exhaust line 79. A dotted line 82 indicates this passage through the slide plate assembly 80.

The slide plate assembly 80 is movable in response to actuation of the second air cylinder 43. A bead blow back passage, indicated by the dotted line 84, extends through the shell 11 and communicates with a bead passage, indicated by the dotted line 85, in the slide plate assembly 80. A bead blow back outlet pipe 86 is connected to a positioning plate 87, which is fixed in position with respect to the shell 11. Therefore, as the slide plate assembly 80 moves in response to the actuation of the second air cylinder 43, relative motion occurs between the positioning plate 87 and the slide plate assembly 80.

Also connected to the positioning plate 87 is a pre-expanded bead inlet pipe 88. The pre-expanded bead inlet pipe 88 extends into a bin 89, shown partially in section, having pre-expanded beads 90 therewithin. Although preferable when using polystyrene beads, the use of pre-expanded beads is not essential, so long as the beads used are expandable. A compressed air line 92, connected at one end to a source of compressed air 93, extends through the bin 90 into the pre-expanded bead inlet pipe 88.

FIGURE 2A is a side elevation of the mold assembly 10 in its opened position. A molded cup 100 is shown in position in the stripper ring 12. A cup stripper arm 101 is illustrated as in contact with the cup. In actual operation, the stripper arm 101 strikes the cup 100 prior to the mold assembly 10 reaching its opened position so as to knock the cup 100 from the stripper ring 12. The stripper arm 101 is connected to a stripper linkage 102 consisting of a first arm 103, to which the stripper arm 101 is attached, and a second arm 104. The first arm 103 and the second arm 104 are connected together by a pin joint 105. The first arm 103 is pivotally connected to an arm support 106 and the second arm 104 pivotally connected to an arm support 107. The first and second arm supports 106 and 107 are attached, respectively, to the second and third mounting plates 16 and 17, by means of bolts 108.

A latching arm 110 has a pivotal connection 111 with the third mounting plate 17. The latching arm 110 terminates at one end thereof in a nose 112. A latch pin 113 extends outwardly from the second mounting plate 16. The latching arm 110 has a latching groove 114 adjacent the nose 112 and a camming surface 115 at the opposite end thereof. A cam 116 is attached to the fourth mounting plate 20 by a pair of bolts 117. A duplicate latching assembly (not shown) is provided on the opposite side of the mold assembly 10. A stop plate 118 is attached to the third mounting plate 17 by means of a pair of bolts 119. The stop plate 118 functions to limit the rotary movement of the latching arm 110.

The second mounting plate 16 has a first pair of stop pads 120 and 121 (stop pad 121 being partially broken away to show the core 13) attached thereto. The first mounting plate 15 has a second pair of stop pads 124 and 125 (stop pad 125 being broken away) attached thereto. The stripper ring 12 is attached to the second mounting plate 16 by means of four bolts 126 (only two of which are shown in FIG. 2A), which extend, one each, through apertures (not shown, see FIG. 8) in four attaching lugs 127 radiating outwardly from the stripper ring periphery.

The shell 11 is attached to the first mounting plate 15 by means of a pair of parallel mounting bars 129 (only one of which is shown in FIG. 2A), to which an attaching flange 130 of the shell 11 is connected by means of bolts 131. The mounting bars 129 are connected to the first mounting plate 15 by bolt assemblies (not shown).

The second and third mounting plates 16 and 17 have mounting sleeves 135 attached thereto which enclose the aligning bars 19.

Figure 2B:
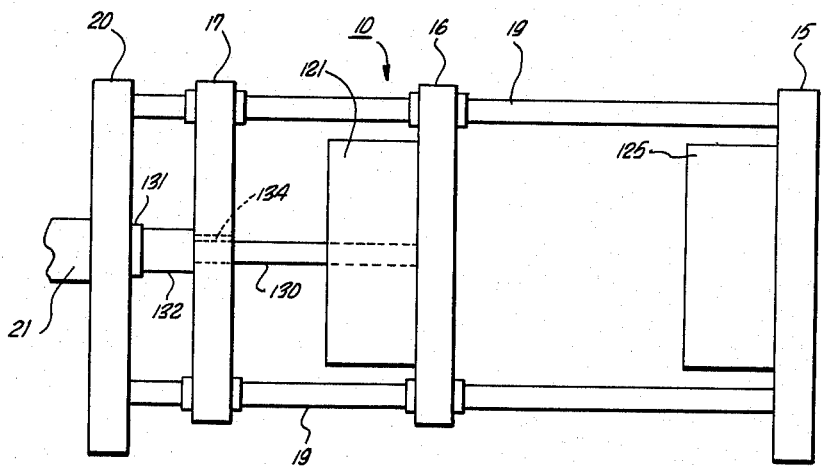
FIGURE 2B is a side elevation of a portion of the apparatus of FIG. 2A.

In FIG. 2B, the mounting of plates 15, 16, 17, 20 are shown with the aligning bars 19, air cylinder 21, piston rod 22, and stop pads 121, 125. The remaining portions of the assembly have been omitted for purposes of clarity. Attached to the second mounting plate 16 are a pair of stop rods 130 (only one is shown in FIG. 2B), each of which terminates in a stop face 131. A stop sleeve 132 is mounted on each of the stop rods 130 so as to be disposed between the stop face 131 and the third mounting plate 17. The rods 130 extend through passages 134 in the third mounting plate 17. When the mold assembly is in the open position shown in FIG. 2B, the second mounting plate 16 is held a fixed distance from the fourth mounting plate 20 by the stop rod 130. The third mounting plate 17 rides against the stop sleeve 132 due to the retracting action of the piston rod 22. The second and third mounting plates 16, 17 are thus also held fixed distances from the fourth mounting plate 20.

Figure 3A:
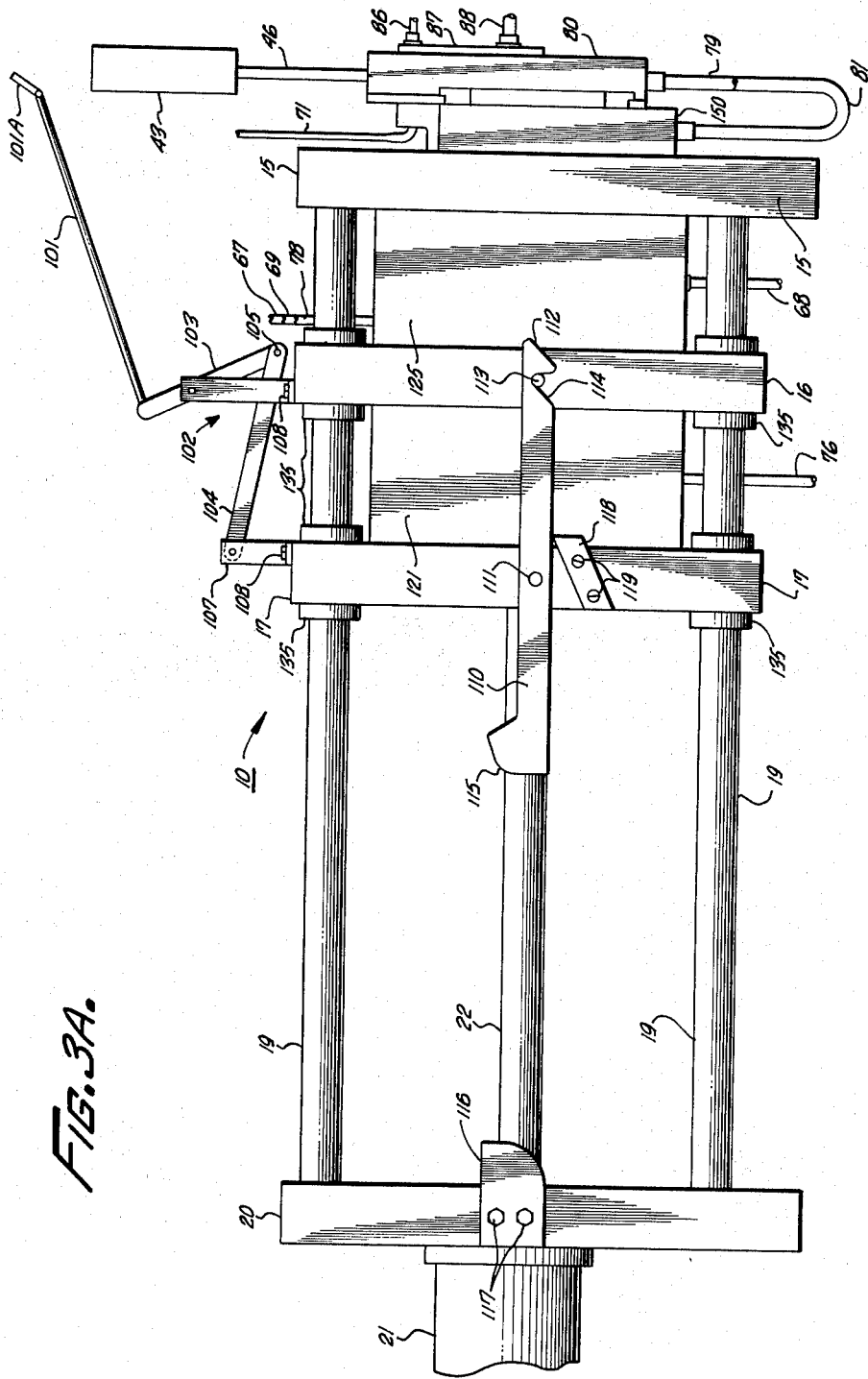
FIGURE 3A is a side elevation of the mold apparatus of FIG. 1 in its closed position.

FIGURE 3A is an elevation of the mold assembly 10 and related components in their closed position. The mold assembly 10 is closed as a result of the actuation of the first air cylinder 21, so as to extend the piston rod 22 in the direction of the first mounting plate 15. As the third mounting plate 17 moves from the fourth mounting plate 20 under the influence of the piston rod 22, the latch camming surface 115 disengages the cam 116 and the latching arm 110 assumes a horizontal position, due to counterweighting means (not shown) on the latching arm 110 adjacent the latching groove 114. A spring may be utilized as an alternative to counterweighting. The nose 112 then rides over the latch pin 113, and the latching groove 114 engages the latch pin 113. The third mounting plate 17 contacts the stop pads 120, 121, which are attached to the second mounting plate 16. Further movement of the third mounting plate 17 under the influence of the piston rod 22 therefore moves the second mounting plate 16 as well as the third mounting plate 17. The second and third mounting plates 16 and 17 continue to move in the direction of the first mounting plate 15, under the influence of the piston rod 22, until such time as the second mounting plate 16 contacts the stop pads 124 and 125. The movement of the second and third mounting plates 15 and 16 is thereby terminated, and the mold assembly 10 is in its closed position.

FIGURE 3B illustrates the disposition of the portions of the mold assembly shown in FIG. 2B when the mold assembly is closed. The stop pad 121 has been partially broken away, as has the third mounting plate 17, in order to more clearly illustrate the structure. It will be noted that the stop rod face 131 is no longer in contact with the fourth mounting plate 20, the second mounting plate 16 now riding against the stop pad 125. The third mounting plate 17 now rides against the stop pad 121 instead of against the stop sleeve 132.

Figure 4:
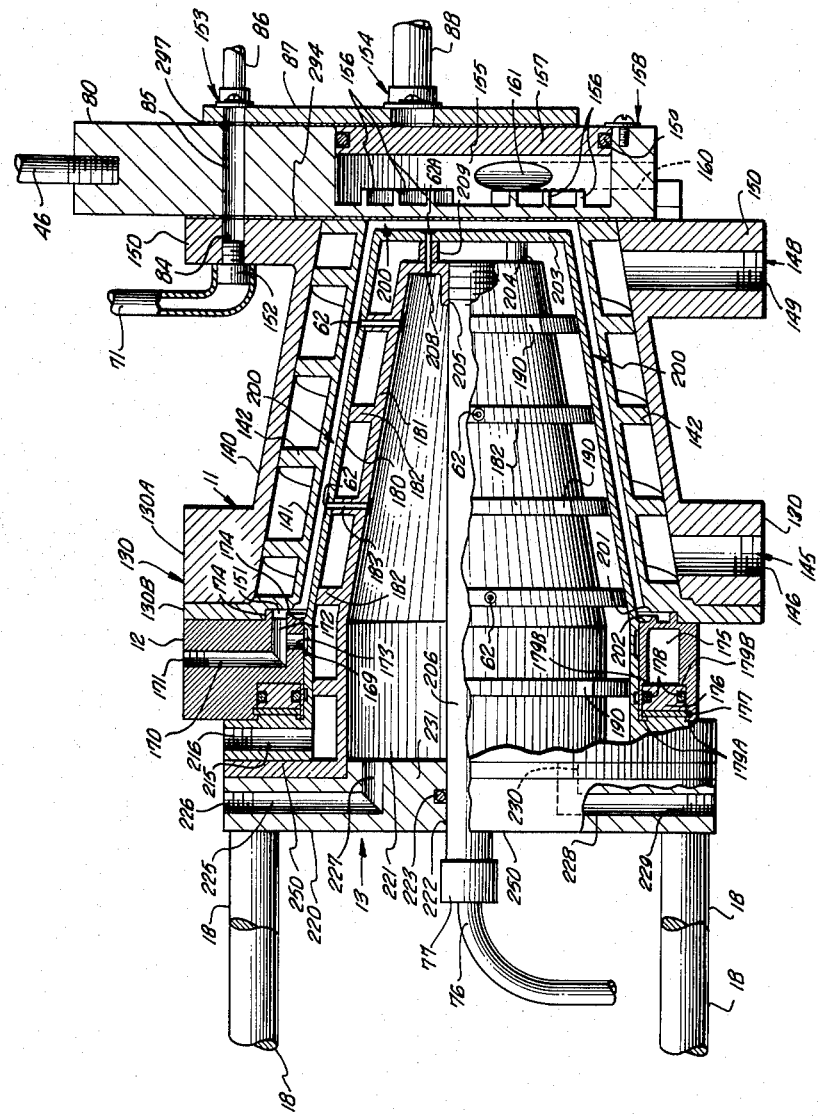
FIGURE 4 is a view, partially in section, of the mold in its closed position.

The mold assembly 10 is shown in its closed position in FIG. 4. The shell 11 includes an outer hollow frustoconical wall 140 and an inner hollow frustoconical wall 141, illustrated in the preferred embodiment as having spiral ribs 142 around the outer surface of the inner wall 141. The outer wall 140 has an outer wall attaching flange portion 130A, and the inner wall 141 has an inner wall attaching flange portion 130B. The outer and inner walls 140, 141 are connected together by bolts passing through the flange portions 130A and 130B. Alternatively, other conventional means, such as welding, may be utilized to connect the outer and inner walls 140 and 141 together. The inner surface of the inner wall 141 is smooth and, when made of aluminum, has a finish deposited thereon which, in order to insure long mold life, is preferably of a hardness in excess of 70 Rockwell C. An example of such a finish is the well known Sanford finish. This finish has a hardness of approximately 72 Rockwell C.

Thus spiral ribs 142 form a spiral fluid passage between the inner and outer walls 140, 141 of the shell 11. A fluid inlet 145, having a threaded portion 146, is formed in the attaching flange 130 so as to communicate with this fluid passage. A fluid outlet 148, having a threaded portion 149, is formed in an end flange 150 of the shell 11, and communicates with the fluid inlet 145 through the fluid passage formed by the spiral ribs 142. The attaching flange 130 has an annular recess 151 on the inner portion 130B thereof.

It should be noted that the end flange 150 has the bead blow back passage 84 extending therethrough. A bead blow back hose, which is the compressed air connecting line 71, is connected to the bead blow back passage 84 by a hollow bolt 152, around the head of which line 71 is clamped. Of course, other types of connections can be used. The bead blow back outlet pipe 86 is fixed to the positioning plate 87 by means of a cap, bolt and washer combination 153. The pre-expanded bead inlet pipe 88 is similarly attached to the positioning plate 87 by a cap, washer and bolt combination 154. The bead inlet pipe 88 is shown as being substantially smaller than the adjacent open end of the shell 13. In many applications, it has been found advantageous to make either the bead inlet pipe 87 or the inlet passage 88 or both comparatively larger than the relative sizes shown.

The slide plate assembly 80 is positioned adjacent the end flange 150 of the shell 11 so as to be slightly spaced therefrom to provide cavity venting. A clearance of three thousandths of an inch has been found to be appropriate in order to vent the cavity to permit the cooking steam to freely contact all of the beads in the mold cavity, while not resulting in beads filling this clearance space during molding. This venting also enables trapped gases in the cavity to escape. The slide plate assembly 80 has a recessed body portion 155 at the lower end thereof, into which a plurality of arcuate ribs 156 extend. A cover plate 157 seals the recessed body portion 155 and is held in position by three bolt and washer combinations 158 (only one of which is shown in FIG. 4). An O-ring 159, positioned in a peripheral groove of the cover plate 157, seals the recessed portion 155. A fluid inlet indicated by the dotted lines 160 has an opening 161 in the recessed body portion 155. The transfer line 81 is connected to the inlet 161. A fluid outlet (not shown, see FIG. 9) opens into the opposite side of the recessed body portion 155. The third exhaust line 79 is connected to this fluid inlet.

The stripper ring 12 has a vacuum connecting passage 170 including a threaded portion 171 at the external end thereof. The vacuum connecting passage 170 has a first branch 172 and a second branch 173, the functions of which will be subsequently explained. The first branch 172 terminates at a pair of lips 174 which engage the annular recess 151 of the attaching flange 130B. The inner lip can be made to protrude less far than the outer lip, in order to assure leakage therearound so as to apply vacuum to the mold cavity, as will be explained subsequently. The stripper ring 12 has a hollow recessed portion 175 therein, which is more clearly shown in FIG. 8. The hollow recessed portion 175 is sealed by means of a sealing ring 176, which is held in position by a snap ring 177. The seal is completed by a pair of O-rings 178, which are positioned in grooves in the inner and outer surfaces of the sealing ring 176. The snap ring 177 is held in position by a pair of outer shoulders 179A and inner shoulders 179B.

The core 13 includes outer and inner walls 180 and 181, similarly to those described with respect to the shell. The inner wall 181 has ribs 182 extending radially outwardly therefrom. The ribs 182 are illustrated as parallel rather than spiral. However, it is to be understood that the rib 182 may be made to be spiral, if desired, or that the spiral ribs 142 of the shell 11 may be parallel. The ribs 182 have slots 190 therein, which allow the passage of fluid between adjacent spaces intermediate between the ribs 182 while providing fluid baffling. The ribs 182 have holes drilled therethrough which coincide with holes in the core outer wall 180. Rivets are inserted in these holes. The rivet head at the outer wall 180 is smoothed so as to be flush with the core surface. Fluid conduits 183, formed through the rivet, terminate in the cooking steam apertures 62. A finish, preferably of a hardness greater than 70 Rockwell C, is applied to the core surface when the core outer wall 180 is made of aluminum. This finish may also be the Sanford finish previously referred to. The inner wall 181 and outer wall 180 can be attached together by any conventional means to assist the rivets in holding the walls 180, 181 in a fixed disposition with respect to each other.

A cup mold cavity 200 is formed between the shell inner wall 141, core outer wall 180, with the lip of the cup being completed by a shoulder 201 on the shell inner wall and a shoulder 202 on the stripper ring 12. The outer bottom wall 180 has a solid end 203, which forms the inner bottom of the cup 100. The inner core wall 181 has an end 204, which has a threaded aperture 205 extending therethrough. A fluid outlet pipe 206 is threaded in this threaded aperture 205. The inner core end 204 and the outer core end 203 are connected to each other by hollow rivets 208 which extend through supporting lugs 209 and have cooking steam apertures 62A to permit the passage of cooking steam into the end portion of the cup mold cavity 200.

A fluid inlet 215, having a threaded portion 216, extends through the outer core wall 180 adjacent the stripper ring 12 and opens into the space between the core inner and outer walls 180 and 181. The slots 190 in the ribs 182 provide a baffled fluid passage between the fluid inlet 215 and the fluid outlet pipe 206. This baffling insures good fluid circulation to provide adequate heat transfer characteristics.

An end plate 220 is attached to the core 13 so as to close a cooking steam space 221 formed within the core inner wall 181. The end plate 220 has a fluid outlet pipe aperture 222 through which fluid outlet pipe 206 passes. A seal between the end plate 220 and fluid outlet pipe 206 is formed by an O-ring 223 which is positioned in a groove formed about the fluid outlet pipe aperture 222. A cooking steam inlet passage 225, having a threaded portion 226, extends through the end plate 220 and opens into the cooking steam space 221 at an inlet aperture 227. A cooking steam outlet passage 228, having a threaded portion 229, extends from an outlet aperture 230 through the end plate 220 from the cooking steam space 221. The inlet and outlet apertures 227 and 230 are formed in a core insert portion 231 of the end plate 220.

FIGURE 5 is a view, partially in section, of the open end of the shell 11. The fluid inlet 145, a portion of the end flange 150 and the bead blow back passage 84 are shown by dotted lines. In the portion partially broken away and shown in section, the disposition of the inner portion 130B and outer portion 130A of the attaching flange 130 are shown, as are the outer wall 140 and inner wall 141 of the shell 11 and one of the spiral ribs 142. Around the inner periphery of the attaching portion inner flange 130B, the annular recess 151 and cavity lip-forming shoulder 201 are shown.

Figure 6:
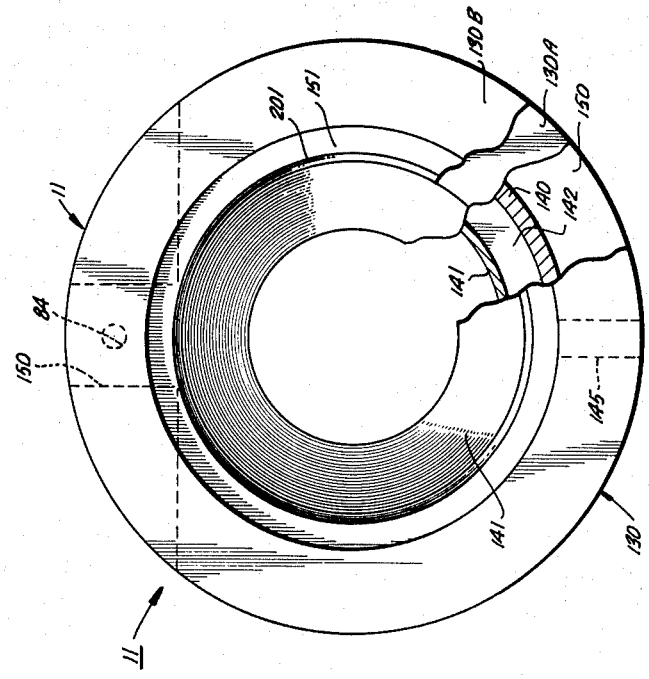
FIGURE 6 is an end view of the mold core component.

FIGURE 6 is a view of the open end of the core 13. One of the ribs 182 and the slot 190 therein are shown by the dotted lines. The relative disposition of the three supporting lugs 209 is shown by the location of the hollowed rivets 208 which extend therethrough and were described with respect to FIG. 4. The core 13 has a core end flange 250 having an end plate mounting slot 251 extending therethrough. The slot 251 is adapted to receive the end plate 220. Four end flange attaching apertures 252 extend through the end flange slot 251, and are utilized to attach the end plate 220 to the end flange 250. The end flange 250 also has four stand-off lug attaching apertures 255, which are utilized to attach the stand-off lugs 18 to the core 13.

FIGURE 7 is an end view of the end plate 220. The core insert portion 231, and cooking steam inlet passage 225, inlet aperture 227, outlet passage 228 and outlet aperture 230 are shown by dotted lines. The fluid outlet pipe aperture 222 extends through the end plate 220. Four core attaching apertures 257 extend through the end plate 220 and are disposed to be in alignment with the four end flange attaching apertures 252 (FIG. 6) in the core 13 when the end plate 220 is inserted in the end plate mounting slot 251 so that the fluid outlet pipe 206 extends through the aperture 222 in the end plate 220. The end plate 220 and core 13 are attached together by nut and bolt combinations (not shown). Of course, any conventional attaching method may be utilized in the alternative.

An end view of the stripper ring 12 is shown in FIG. 8. The vacuum connecting passage 170, first branch opening 172, and second branch opening 173 are shown by dotted lines. For purposes of clarity, dotted lines indicating the pair of lips 174 are omitted. A first connecting passage 260, to which the second manifold outlet line 67 (FIG. 1) is connected and a second connecting passage 261, to which is connected the second exhaust line 78, are shown by dotted lines, and open into the hollow recessed portion 175. Each of the attaching lugs 127 has a hole 263 extending therethrough, through which a bolt 126 (see FIG. 2) extends to attach the stripper ring 12 to the second mounting plate 16.

Figure 9:
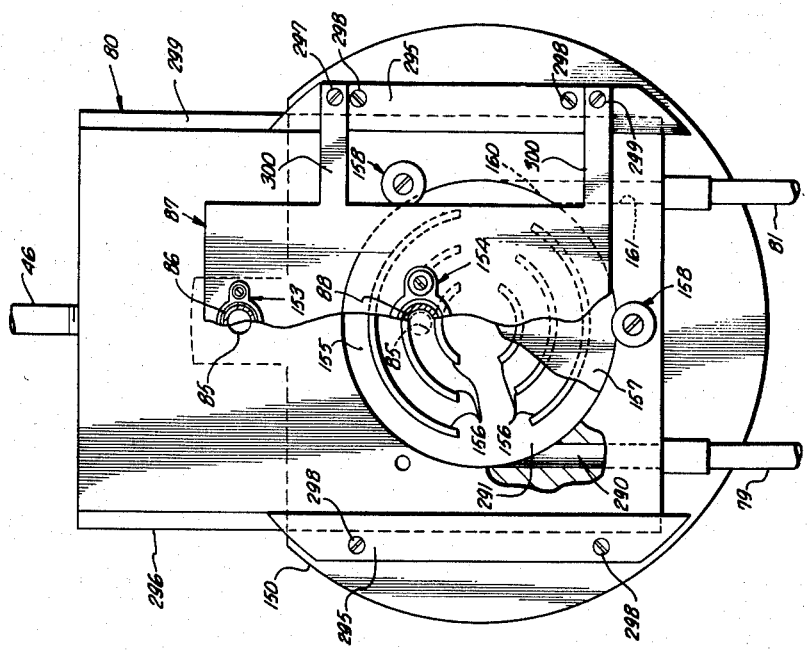
FIGURE 9 is an end view, partially in section, of the slide plate which closes the shell; and, FIGURE 10 is a timing chart illustrating the timing sequence for control of the apparatus by the programmer.

FIGURE 9 is an end view of the slide plate assembly 80, positioning plate 87, and shell end flange 150. The positioning plate 87 and cover plate 157 have been partially broken away to show the arcuate ribs 156 in the recessed body portion 155 of the slide plate assembly 80. In addition, a fluid outlet passage 290 is shown, which was previously referred to with respect to FIG. 4, and to which the third exhaust line 79 is connected. The fluid outlet passage 290 has an opening 291 which opens into the recessed body portion 155. The slide plate assembly 80 is connected to the end flange 150 by means of a pair of slide plate holders 295. The slide plate assembly 80 has a pair of ribs 296 which engage slots (not shown) in the slide plate holders 295. Spacer plates 294 are positioned between the slide plate 80 and end flange 150 to provide cavity venting during molding. The slide plate holders 295 and spacer plates 294 are attached to the end flange 150 by means of bolts 293. The slide plate assembly 80 is thus free to move vertically but is restrained from horizontal movement. The positioning plate 87 is separated from the slide plate 80 by spacer plates 297 and attached to the slide plate holders 295 by means of bolts 299 which extend through apertures (not shown) in attaching arms 300 of the positioning plate 87. The bolt and washer assemblies 158 and positioning plate 87 provide vertical stops for the vertical movement of the slide plate assembly 80. However, in normal operation, the vertical movement of the slide plate assembly 80 is such as to not normally require this stop function to be utilized. Dotted lines indicate the positioning of the bead passage 85 when the slide plate assembly 80 is in the lowered position utilized to fill the mold cavity with pre-expanded beads 90 through the pre-expanded bead inlet pipe 88.

Figure 10:
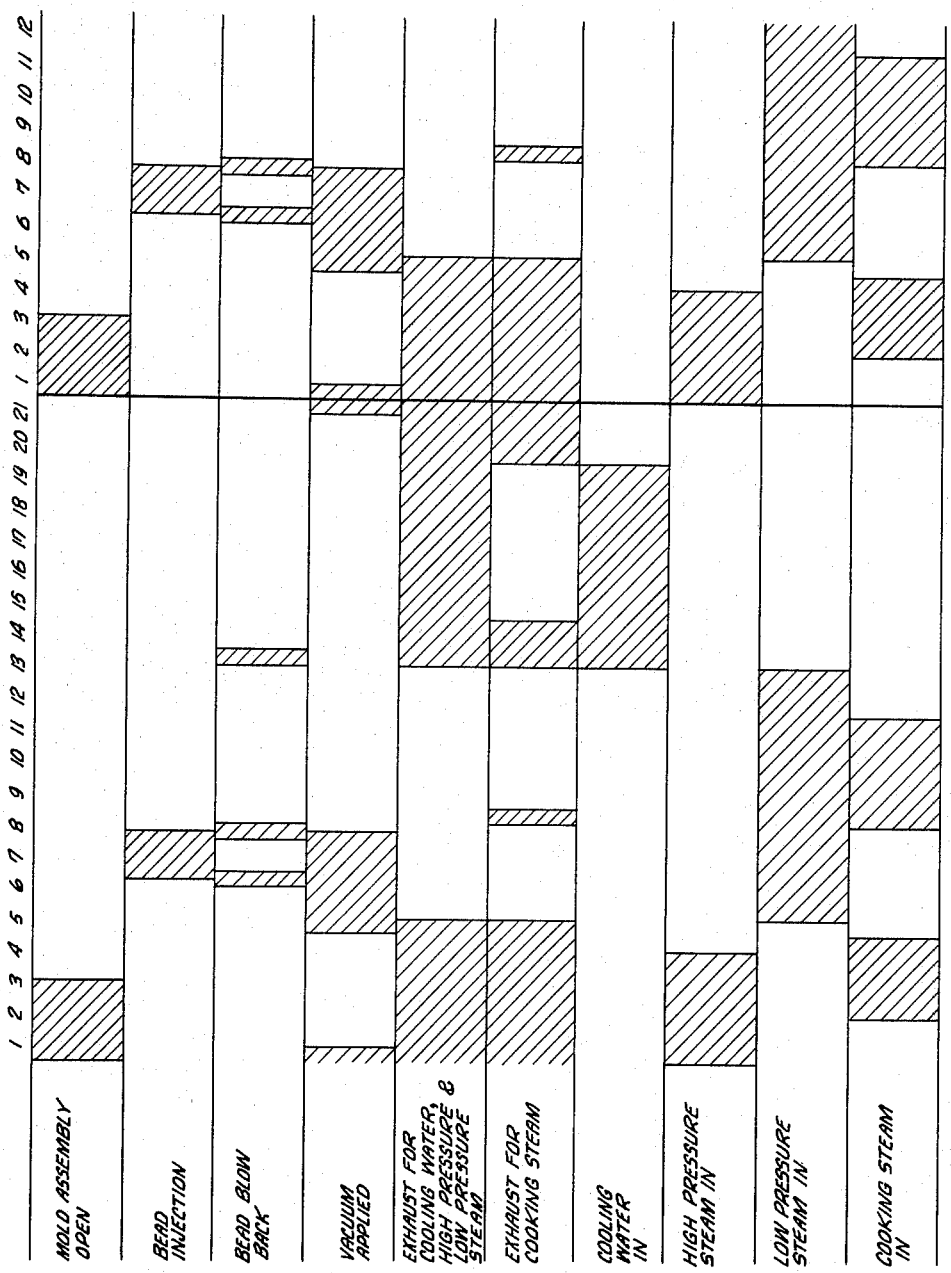

FIGURE 10 illustrates the timing sequence followed in the preferred method of practicing the invention. The mold assembly opening is taken as the cycle initiation time, although, as a practical matter, the cycle is continuous and not susceptible to having any single point designated as the time of cycle initiation. The numbers across the top of the chart may be considered as indicating time intervals in seconds. It is to be understood that the time intervals given may be varied while still obtaining satisfactory molding. In addition, ambient conditions, such as humidity and temperature, may make advisable some deviation from the time intervals shown. However, such deviations do not depart from the scope of the invention, and the timing sequence of FIG. 10 is given so that the invention may be more easily understood and practiced. As has already been stated, the use of the terms high pressure steam, low pressure steam, cooking steam, and cooling water are not to be considered as limiting the practice of the invention to these particular fluids. Any fluid having appropriate characteristics may be substituted for any of the aforementioned fluids.

Coincident with the opening of the mold assembly 10, high pressure steam is applied to the manifold 65 by the opening of the high pressure steam valve 36. The high pressure steam is utilized to pre-heat the mold 10 to substantially the temperature at which molding takes place. Appropriate conditions for the high pressure steam are saturated steam at a pressure of 80 p.s.i.g. At the time the mold assembly 10 is opened, vacuum is being applied to the stripper ring 12 due to the opening of the vacuum inlet valve 38 and the closing of the vacuum check valve 56. The high and low pressure steam and cooling water exhaust valve 52 is also open, as is the cooking steam exhaust valve 50.

About one-half second after the mold assembly 10 commences to open, which is substantially the time interval required for the second mounting plate 16 to become unlatched from the third mounting plate 17, the vacuum valve is closed. Cooking steam is applied to the core 13 by the opening of the cooking steam inlet valve 30 at a time one and one-half seconds after the mold assembly 10 opens. The cooking steam 30 may be saturated steam at a pressure of 28 p.s.i.g. The mold assembly 10 remains open for approximately two and one-half seconds, during which time the cup stripper arm 101 frees the molded cup 100 from the stripper ring 12. The cup falls away from the mold assembly 10 due to the effect of gravity. The mold assembly 10 then closes two and one-half seconds after opening.

At the time the mold assembly 10 closes, the cooking steam exhaust valve 50 is open to vent the cooking steam space 221. The high and low pressure steam and cooling water exhaust valve 52 is also open, insuring a rapid flow of high pressure steam through the shell 11 and core 13 baffle systems. In the middle of the fourth time interval, i.e., three and one-half seconds after the mold assembly 10 opens, the high pressure steam valve closes, terminating the pre-heating of the core 13 and shell 11. At the end of the fourth time interval, the cooking steam inlet valve closes, and the vacuum inlet valve opens. The application of the vacuum to the mold cavity through leakage around the lip-forming shoulder 202 of the stripper ring 12 reduces the pressure existing within the mold cavity. The cavity walls have been heated to a temperature preferably of about 265° Fahrenheit by the high pressure steam. The combination of this temperature and reduced pressure flash-vaporizes any moisture which may have condensed in the cavity 200 and exhausts the vapor through the leakage around the stripper ring lip-forming shoulder 202. In order to assure a rapid reduction in pressure, it is preferred to provide the previously mentioned clearance between the inner of the pair of lips 174 and the lip-forming shoulder 201 of the shell, as has been pointed out with respect to FIG. 4.

Midway through the fifth time interval, the cooking steam exhaust valve 50 and the high and low pressure steam and cooling water exhaust valve 52 close, and the low pressure steam inlet valve 34 opens. Low pressure steam, which may be saturated steam at a pressure of 25 p.s.i.g., is then applied to the stripper ring 12, core 13 and shell 11.

At the middle of the sixth time interval, the bead blow back valve 40 opens, applying compressed air to the bead blow back passage 84 to clear the bead passage 85 for the injection of pre-expanded beads 90 into the mold cavity 200. Just prior to the end of the sixth time interval, the second air cylinder control valve 52 is actuated to cause the slide plate 80 to move its lower position, so as to align the bead passage 85 with the pre-expanded bead inlet pipe 88. The bead blow back valve 40 then closes.

Pre-expanded beads 90 are injected into the mold cavity 200 by the force of the compressed air applied to the pre-expanded bead inlet pipe 88 by the compressed air line 92. The application of vacuum to the stripper ring 12 insures that the beads fill the mold cavity 200 especially that portion forming the cup lip. Shortly after the start of the eighth time interval, the slide plate assembly 80 is returned to its upper position, terminating the injection of beads 90 into the cavity 200. The vacuum inlet valve 38 closes. The bead blow back valve 40 is then opened briefly to clear the bead passage 85 of beads which remain therein after the mold cavity 200 was filled. If the bead passage 85 is not cleared, the beads remaining therein may expand and clog the passage, so that the subsequent bead injection into the mold will not be possible.

The cooking steam inlet valve 30 is opened at the middle of the eighth time interval to apply cooking steam to the pre-expanded beads in the mold cavity 200. The cooking steam exhaust valve 50 is opened briefly at this time to vent the air in the cooking steam space 221, so that the cooking steam space 221 is rapidly filled with cooking steam. The cooking steam inlet valve 30 closes at the end of the eleventh time interval, i.e., eleven seconds after the opening of the mold assembly 10 in the example given.

Midway during the thirteenth time interval, the low pressure steam inlet valve 34 closes, and the mold cooling cycle commences. The cooking steam exhaust valve 50 and the high and low pressure steam and cooling water exhaust valve 52 open. The cooling water inlet valve 32 opens, applying cooling water to the manifold 65, from which it passes to the core 13, shell 11 and stripper ring 12. The bead blow back valve 40 is also opened briefly to remove any cooking steam condensate which may have accumulated.

At the end of the fourteenth time interval, the cooking steam exhaust valve 50 closes, the temperature of the mold assembly 10 having been reduced to a temperature such that any cooking steam has either been exhausted or condensed.

The cooling water inlet valve 32 closes at the middle of the nineteenth time interval, and the cooking steam exhaust valve 50 simultaneously opens. The cooking steam exhaust valve 50 is opened in order to facilitate removal of the cup from the core 13 after the mold assembly 10 opens. Just prior to the opening of the mold assembly 10, the vacuum inlet valve 38 opens, and vacuum is applied to the lips of the cup 100, which has been formed within the cavity 200. When the mold assembly 10 commences to open, this vacuum insures that the cup will be drawn out of the shell 11 by the movement of the stripper ring 12. At the time when the stripper ring 12 movement stops, the core 13 continues to move. In order to prevent the existence of a vacuum between the cup 100 and the core 13, the opened cooking steam outlet 51 permits the passage of air through the cooking steam apertures 62 upon withdrawal of the core 13 from the cup 100. Otherwise, a vacuum might result which would cause the cup 100 to deform. However, the necessity for application of compressed air to core apertures required by the prior art is eliminated by the invention. Thus, a cycle of the molding apparatus has been completed and the apparatus now commences a second such cycle to form another cup.

The mold assembly 10 is constructed from conventional materials. For example, aluminum or steel may be utilized. The cavity walls 141, 180 may be of one-eighth inch thickness when made of aluminum, or of one-twentieth of an inch thickness when made of stainless steel. An aperture diameter of eighteen-thousandths of an inch for the sides and twenty-thousandths of an inch for the bottom has been found to be satisfactory for the cooking steam apertures 62 and 62A. Of course, while the apertures 62 and 62A are shown as formed in the core wall 180, they can equally well be formed in the shell wall 141, or in both. It is, however more convenient structurally to form the apertures in the core 13 and utilize the core center as the cooking steam space 221. The apertures may range in diameter from ten to thirty-thousandths of an inch for thinwalled objects, and range up to one-sixteenth of an inch for thickwalled objects. The cavity 200 may have a width of three thirty-seconds of an inch when molding cups or other thinwalled objects, thus forming a cup having walls of this thickness. Heretofore, it has not been possible to form cups by the application of steam directly to pre-expanded polystyrene beads in a mold cavity of only this thickness. The conventional practice has required only indirect bead heating during molding of cups when cavity thicknesses of less than one-quarter inch have been utilized, and cooking steam and venting have not been utilized heretofore successfully to produce objects automatically, regardless of wall thickness.

When utilizing steam of the pressures given in the foregoing description of operation, cooling water at a temperature of about 83° Fahrenheit, a vacuum of 22 inches, and compressed air at a pressure of 100 p.s.i.g. are appropriate values. The operation of the apparatus may be readily monitored by measuring the temperature of fluid existing in the transfer line 81. A conventional thermocouple may be used for such a measurement. Optimum operation utilizing the above conditions has been found to result when the operating temperatures within the transfer line 81 fall within ten degrees of the following mean temperatures:

Temperature at the time of closure of high pressure steam inlet valve—265° Fahrenheit;
Temperature during molding—initially 260° Fahrenheit, rising to 264° Fahrenheit at the time of closure of low pressure steam inlet valve;
Temperature during cooling—falling rapidly from a temperature of 264° Fahrenheit when the cooling water inlet valve opens to a temperature of 110° Fahrenheit when the cooling water valve closes.

The optimum conditions have been found to vary from day to day, due to changes in ambient conditions and to the aging of the pre-expanded beads. The aging of the pre-expanded beads is an important consideration, since it has been found that temperature adjustments within a ten degree range are necessary to compensate for changes in the physical characteristics of the beads which occur as a result of storage both before and after pre-expansion. In addition, the bulk density of the pre-expanded beads has an important effect upon the optimum temperature conditions for operation. The above temperatures are especially appropriate for utilization with pre-expanded beads of a bulk density of between one and ten pounds per cubic foot, and are usually satisfactory up to fifty pounds per cubic foot. This range of bead density has been found to be the optimum range of density for making cups. Cups made from lighter densities do not have the required strength, while cups made from heavier densities tend to lose some of their insulating characteristics, due to the extreme density of their construction.

The programmer utilized to control the operation of the apparatus is of conventional construction. A wide variety of such programmers are available. Perhaps the simplest such programmer is a motor-driven electrically conductive belt. An electrical potential is applied to the belt. Each of the control circuits terminates in one of an array of contact arms which ride against the belt, so as to provide continuous electrical circuits. Insulating strips are applied to the belt to interrupt the continuity of the electrical control circuits as appropriate to provide the actuation and deactuation of the various valves of the apparatus. For example, referring to FIG. 10, the belt would have insulating strips corresponding to the blank portions and electrical conductivity between the belt and the contact arms would occur in the shaded portions. Of course, a variety of more elaborate systems for control can be devised, and it is to be understood the use of such systems constitutes practice of the present invention, which, in its broad aspects, is not limited to any particular control apparatus, as distinguished from the novel method and apparatus for practice of applicants' invention, and the novel objects made thereby.

The invention has been described in its preferred embodiment, which includes the application of cooking steam to the mold cavity concurrent with the venting of the mold cavity, which takes place throughout the molding period of the cycle. However, the invention may also be practiced by the utilization of these two elements in cooperation during only a portion of the molding portion of the cycle. Thus, the cooking steam may be applied throughout the molding portion, while the cavity is vented during only a portion of this time interval. To accomplish this, vent passages may be provided in the slide plate to vent the cavity when the slide plate is in an intermediate position, for example. Other systems, such as a vent valve assembly, can be used. Furthermore, the cavity can be vented throughout the molding portion of the cycle, and cooking steam applied to the mold cavity throughout this time interval. Such a modification is readily accomplished by adjustment of the programmer. In addition, while it is to be understood that it is preferred to utilize cooking steam and cavity venting during molding in cooperation, as has been described heretofore, a significant improvement over the prior art is provided by the utilization of either the application of cooking steam to the mold cavity during molding or the venting of the cavity during molding, when articles are to be automatically molded from expandable beads.

As used herein, the term venting of the cavity refers to providing a passage for the escape of fluid from the cavity during molding, as distinguished from during the filling of the cavity with beads, and is not limited to such a passage directly communicating with the atmosphere, and the term application of cooking steam to the mold refers to providing the presence of cooking steam or other appropriate fluid within the mold cavity.

The invention claimed is:

1. The method of forming a cup with pre-expanded polystyrene beads in a cup mold cavity, the method consisting of the steps of preheating the mold cavity, injecting the pre-expanded beads into the pre-heated cavity, concurrently and coextensively applying heat to the mold from a first source and applying steam at substantially the same temperature as is the average temperature to which the mold cavity is preheated to the mold cavity from a second source, so as to cause the beads to expand and fill the mold cavity, and removing the formed cup from the mold cavity.

2. The method of claim 1 and including the step of venting the mold cavity during molding.

3. The method of making a cup with pre-expanded polystyrene beads in a heated cup mold having a male part and a female part which fit together to form a mold cavity, the method consisting of the steps of substantially filling the cavity of the mold with pre-expanded beads, and expanding the pre-expanded beads within the mold cavity by the concurrent and independent application of steam to the cavity and of heat to the mold so that the beads expand and fill the cavity while venting the cavity at a location separate from the points of steam of application and removing the cup from the cavity.

4. The method of making a cup from pre-expanded polystyrene beads in a heated cup mold defining a mold cavity consisting of the steps of substantially filling the cavity of a heated cup mold with pre-expanded beads, expanding the pre-expanded beads within the mold cavity by the concurrent application of heat to the mold through a first conduit means and to the mold cavity through a second conduit means, the application of heat to the mold being independent of the application of heat to the mold cavity so that the beads expand and fill the cavity while venting the cavity through a third conduit means and removing the cup from the cavity.

5. A method for automatically molding objects from expandable beads consisting of cyclically repeating the steps of closing a mold having first, second, and third parts which fit together to form a mold cavity, heating the mold cavity, injecting expandable beads into the cavity, concurrently and coextensively applying heat to the mold from a first source and to the mold cavity from a second source while venting the cavity to form a molded object within the cavity from the beads, cooling the cavity, moving the first part of the mold relative to the second and third parts to clear the molded object from the first part, moving the second part relative to the third part to clear the molded object from the second part and thereafter removing the molded object from the third part.

6. A method for automatically molding objects from expandable beads consisting of cyclically repeating the steps of closing a mold having first, second and third parts which fit together to form a mold cavity, preheating the mold cavity, injecting expandable beads into the cavity, concurrently and coextensively applying steam to the mold from a first source and cooking steam to the mold cavity from a second source while venting the cavity at a location separate from the sources of steam application to form a molded object within the cavity from the beads, cooling the cavity, moving the first part of the mold relative to the second and third parts to clear the molded object from the first part, moving the second part relative to the third part to clear the molded object from the second part and thereafter removing the molded object from the third part.

7. The method of making a cup with pre-expanded polystyrene beads in a cup mold cavity, the method consisting of the steps of injecting the pre-expanded beads into the cavity of a cup mold which has been preheated from a temperature substantially greater than ambient to substantially 265° Fahrenheit, concurrently and coextensively maintaining the mold at a temperature of substantially 265° Fahrenheit by means of heat from a first source and applying steam from a second source at a temperature at substantially 265° Fahrenheit to the mold cavity through a plurality of apertures which extend through one of the cavity walls and have a diameter of between ten and thirty-one thousandths of an inch, so as to cause the beads to expand and fill the cavity, cooling the mold, and removing the formed cup from the mold cavity.

8. The method of claim 7 and including the step of venting the mold cavity during molding.

References Cited by the Examiner
UNITED STATES PATENTS

| | | | |
|---|---|---|---|
| 2,951,260 | 9/1960 | Harrison et al. | 264—53 XR |
| 2,954,589 | 10/1960 | Brown | 264—51 XR |
| 2,977,639 | 4/1961 | Barkhuff et al. | 264—45 |
| 3,069,725 | 12/1962 | Root | 264—51 |
| 3,086,248 | 4/1963 | Culp | 264—53 |
| 3,099,045 | 7/1963 | Honkanen | 264—51 XR |
| 3,125,780 | 3/1964 | Harrison et al. | 18—5 |

OTHER REFERENCES

Koppers: Technical manual Dylite expandable polystyrene, "Mold Techniques and Mold Designs," ch. 3e, Bulletin C–9–273, Nov. 15, 1959, all pages.

Koppers: Technical manual Dylite expandable polystyrene, "Mold Filling," ch. 3d, Bulletin C–9–273, Nov. 15, 1959, all pages.

ALEXANDER H. BRODMERKEL, *Primary Examiner.*